Sept. 6, 1960　　　W. R. KEMPF ET AL　　　2,951,891
BATTERY CASE CONSTRUCTION
Filed Nov. 20, 1957

*INVENTOR*
WALTER R. KEMPF
JOHN W. RHYNE, JR.

BY *m.r.Gould*

ATTORNEY

United States Patent Office 2,951,891
Patented Sept. 6, 1960

2,951,891

BATTERY CASE CONSTRUCTION

Walter R. Kempf, Lancaster, and John W. Rhyne, Jr., Columbia, Pa., assignors to Hamilton Watch Company, Lancaster, Pa., a corporation of Pennsylvania Filed Nov. 20, 1957, Ser. No. 697,616

5 Claims. (Cl. 136—169)

This invention relates to batteries and more particularly relates to an improved type of casing for a primary dry cell.

In alkaline dry cells using a zinc anode, a mercuric oxide depolarizing cathode and a potassium hydroxide electrolyte, gas is generally generated in the cell due to impurities, improper storage conditions, or other causes, and this gas builds up a high pressure within the case, frequently causing cell leakage. In the assignee's copending application Serial No. 548,660, filed November 23, 1955, now Patent No. 2,837,593, there is shown a cell which is constructed to withstand high internal pressures and thereby minimize this leakage. That cell and the one disclosed herein are primarily intended for use in the assignee's electric wrist watch and are thus exceedingly small in size, being on the same order of size as an ordinary shirt button. Because of this miniature size certain manufacturing difficulties are encountered which make it impossible to utilize the same expedients which are common in larger cells. According to the disclosure in the assignee's aforementioned copending application, a highly fluid tight seal is produced by means of a punch and die which forms the seal beyond the outer periphery of the cell and which provides a relatively large seal area. According to the method of that invention the contact of the seal extends over a generally circular surface about an angle in excess of 180°.

While the cell shown in the aforementioned copending application is capable of withstanding internal pressures on the order of 1,000 pounds per square inch, it has now been found that it is possible to manufacture primary dry cells of this type which will withstand internal pressures substantially in excess of this without sacrificing any of the desirable features which lead to ease of manufacture. According to that previous invention the cathode containing portion of a disc type cell was provided in the form of a shallow cup-like member having a flared upper edge which was rolled outwardly and downwardly. According to conventional methods this cathode containing cup was formed of steel or some such similar metal. The anode containing casing might conventionally be formed of tin coated steel or other suitable metal and according to that invention was wrapped around the rim through an angle in excess of 180°. The anode containing casing was provided with an angular groove radially inward of the rim to assist in holding the anode.

When high pressures are generated in a cell of this type, the anode casing tends to dome upwardly and the rim provided in the anode casing serves to provide slack metal which allows such doming to continue even further. That is to say, the expanding gases within the cell cause the top of the cell to dome upwardly until the annular groove is completely stretched out. Under these conditions, the sealing surface between the two halves of the cell casing is reduced to 180° or less and the domed upper portion of the cell tends to slide completely off of the lower casing half. This action is further facilitated by the fact that the tin coated metal of the anode containing casing is not so tough or strong as the plain or nickel coated steel which is used for the lower casing half.

According to the present invention it has now been found that the foregoing difficulties may be obviated and the pressure withstanding capabilities of the cell markedly improved if a somewhat different cell and seal construction is utilized. Thus it has now been found desirable to utilize an anode containing casing half which is dished upwardly at the center thereof and which is provided with a flat outwardly extending flange having its outer peripheral edge rolled upwardly to form a rim. The cathode containing casing half has an upper mouth which is formed about this rim through an angle in excess of 180° and its cylindrical portion is of such a diameter as to lie generally outside of the cylindrical portion of the anode casing. A neoprene or similar washer is received between the rim of the anode containing casing half and the rolled mouth of the cathode casing half and cooperates with the rim to provide a sealing action which possesses a reserve capacity for insuring against destruction of the seal even though there is a certain amount of bending of the cell casing. In addition the new construction provides for the stronger cathode casing half to be rolled about the anode containing casing half and this has been found to provide additional strength.

It is accordingly a primary object of the present invention to provide an improved primary dry cell capable of withstanding high internal gas pressures.

It is another object of the invention to provide an improved primary dry cell of the disc type having a seal between the casing halves which lies outwardly of the periphery of the cell and which is capable of withstanding exceedingly high internal cell pressures.

It is another object of the invention to provide an improved primary dry cell of the disc type having a seal between the casing halves which is capable of withstanding high pressures despite some deformation in the casing.

These and further objects and advantages of the invention will become more apparent upon reference to the following specification and claims and appended drawings wherein:

Figure 1:
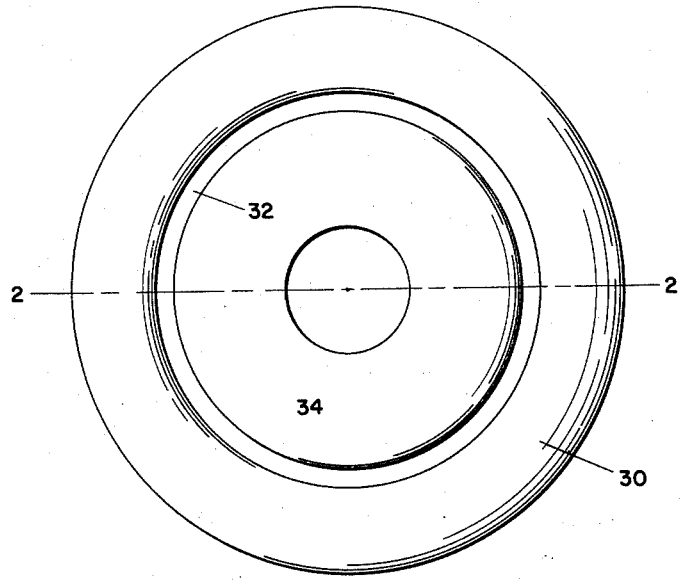
Figure 1 is a plan view of a primary dry cell of the disc type constructed according to the present invention.

Referring more particularly to the figures of the drawing, the primary dry cell of this invention is preferably of the alkaline type and may have a zinc anode, potassium hydroxide electrolyte and murcuric oxide cathode depolarizer. As is conventional, the anode may consist of a pressed zinc powder, and the cathode may be formed of a mixture of mercuric oxide with about 10 percent of finely divided graphite. The electrolyte may consist of a 43 percent solution of potassium hydroxide which is substantially saturated with alkali zincate as is well known in the art. Since the invention relates to the cell casing the electrodes and internal elements of the cell are not shown in the drawings. Reference may be had to applicants copending applications if such details are desired.

Figure 2:
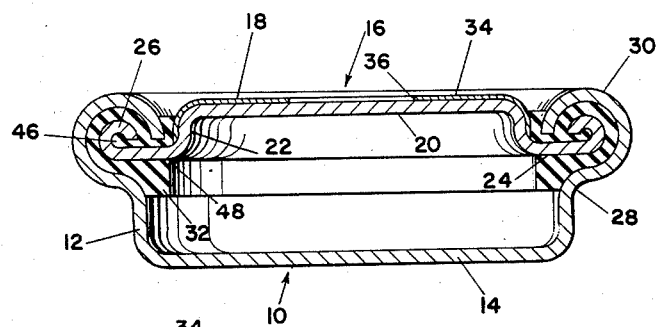
Figure 2 is a vertical section of the cell of Figure 1 taken along the line 2—2.

Referring most particularly to Figure 2, the dry cell of this invention consists of a cathode casing half 10 having a shallow generally cylindrical portion 12 and bottom 14. The anode containing casing half 16 comprises a dished portion 18 having a top 20 and shallow generally cylindrical side walls 22. An annular flange 24 extends out from the end of the cylindrical side walls 22 and terminates in an upwardly rolled rim 26. The upper edge of the cylindrical portion 12 of the cathode containing casing half is flared outwardly at 28 and rolled about the rim 26 at 30 through an angle in excess of 180°. A neoprene or similar washer 32 is enclosed between the roll 30 and rim 26 to form the seal. In order to prevent shorting of the cell when it is placed with its anode down on an uneven metal surface an insulating washer 34 having a central aperture 36 is mounted over the top of the anode containing casing half.

While it is obvious that a high capacity for withstanding internal pressure would indicate the use of strong materials for the cell casing, certain electro-chemical considerations limit the types of casing materials which can be used. Thus while the cathode containing casing half may be made from a relatively tough material such as nickel plated steel, the anode containing casing half must be formed of a metal inert to the electrolyte and having a low contact potential with respect to zinc. That is to say, the anode containing casing half preferably has a high hydrogen over-voltage. Examples of suitable materials are tin, cadmium or indium coated steel, copper and silver and alloys thereof with other metals. Generally speaking, with the extremely miniature cell of this invention utilized in electric wrist watches, both casing halves may be formed of steel eight one-thousandths of an inch thick and may have coatings thereon one one-thousandths of an inch thick on each side, the cathode containing casing half having a nickel coating and the anode containing casing half having a tin coating.

The metals which are permissible for use in forming the anode containing casing half are not as tough or strong as those which may be used for forming the cathode containing casing half, and it has been found that superior pressure resisting capacity is obtained if the seal between the two casing halves is formed with the stronger metal rolled around the weaker metal rather than vice versa.

Figure 3:
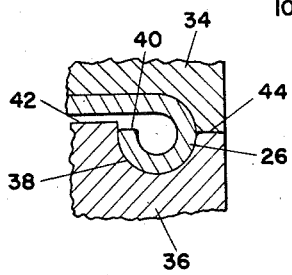
Figure 3 is a vertical section showing the formation of a rim on the anode half of the cell casing.

In the manufacture of the anode containing casing half, the rim 26 is formed by means of a pair of dies partially shown at 34 and 36 in Figure 3. Referring to that figure, it will be seen that the rim 26 is formed by moving the dies 34 and 36 together so that the rim metal is forced downwardly and then upwardly in the annular depression 38 in the lower die 36 through about 270°. In the formation of such a rim it has been found desirable to so shape the metal from which the rim is formed that the end 40 of the metal is not rolled completely around to engage the surface 42 of the annular flange 24. When an attempt is made to form a butt joint between this end 40 and flange 42 it has been found that some excess metal is invariably present in a large percentage of casing halves and that this metal tends to force its way out at the meeting plane of the dies at 44. When this occurs the anode containing casing halves have a protruding rough lip around the outer periphery thereof which must be removed by a tumbling or a similar operation. However, it has been found that with the tiny cells of the type disclosed herein having a coating only one one-thousandths of an inch thick, the tumbling operation removes the tin coating essential to good electro-chemical action.

It is accordingly an important feature of this invention that the anode containing casing half has the rim 26 formed therein in such a manner that the edge 40 is spaced from the surface 42 of the flange 24. Not only does this eliminate the formation of the undesired lip at the outer periphery of the casing half, but another important result is obtained.

Referring to Figure 2, when the roll 30 of the lower casing half is formed about the rim 26 by means of dies of the same general type as shown in Figure 3, the pressure forces the neoprene gasket or washer 32 into the opening between the edge 40 of the rim and the surface 42 of the annular flange 24 as shown at 46. This produced two results. First, the leakage path for the electrolyte or for any mercury formed in the anode containing casing half is now an extremely tortuous path which extends from the point 48 around the rim 26, into the recess 46, and thence along the annular flange 24. Second, the gasket material contained in the recess 46 is under compression and forms a reservoir of resilient material which is capable of expanding to occupy any increased space which may be created by bending of the roll 30 in the handling of the cell.

Considering the cell casing shown in Figure 2, the generation of high pressure within the casing tends to dome the anode containing casing half upwardly. This tends to straighten out the shallow cylindrical wall portion 22 but is resisted by means of a locking action between the flange 24 and roll 26 and the positive manner in which the rim 26 is locked within the roll 30. That is to say, the doming action does not detract from the strength of the seal but rather forces it into an even more positively locked position. While the cell disclosed in assignee's copending application Serial No. 548,660 discussed hereinabove, is capable of withstanding rupture pressures of about 1,000 pounds per square inch, actual tests have shown that the cell of this invention is capable of withstanding pressures in excess of 2,000 pounds per square inch.

It will be seen that this cell retains the desirable feature disclosed in the aforementioned copending application wherein the seal between the upper and lower casing half is formed almost completely externally of the main bodies of the casing halves. This permits the application of considerable pressure without the danger of deforming or damaging the cell contents and facilitates the handling of the extremely tiny casing halves involved.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a primary dry cell containing an anode and a cathode, an anode containing casing half having a cylindrical dished portion with an annular flange extending outwardly therefrom and a rolled rim at the outer edge of said flange; a cathode containing casing half of substantially stronger material than said anode containing casing half having a dished portion of a greater diameter than the dished portion of said anode containing casing half and an outwardly flared edge extending therefrom, said edge being rolled about a resilient gasket surrounding said rim to seal said casing halves together.

2. In a primary dry cell containing an anode and a cathode, a metallic anode containing casing half having a cylindrical dished portion with an annular flange extending outwardly therefrom and a rolled rim at the outer edge of said flange, a cathode containing casing half of substantially stronger metal than said anode containing casing half having a dished portion of a greater diameter than the dished portion of said anode containing casing half but of a lesser diameter than said rim, and an outwardly flared edge extending therefrom, said edge being rolled about a resilient gasket surrounding said rim to seal said casing halves together.

3. In a primary dry cell containing an anode and a cathode, a metallic anode containing casing half having a cylindrical dished portion with an annular flange extending outwardly therefrom and a rolled rim at the outer edge of said flange, said rim being rolled through an angle of approximately 270° with the edge of the rim spaced from the adjacent surface of said flange, a cathode containing casing half of substantially stronger metal than said anode containing casing half having a dished portion of a greater diameter than the dished portion of said anode containing casting half and an outwardly flared edge extending therefrom, said edge being rolled about a resilient gasket surrounding said rim to seal said casing halves together.

4. In a primary dry cell containing an anode and a cathode, a metallic anode containing casing half having a cylindrical dished portion with an annular flange extending outwardly therefrom and a rolled rim at the outer edge of said flange, said rim being rolled through an angle of approximately 270° with the edge of the rim spaced from the adjacent surface of said flange, a cathode containing casing half of substantially stronger metal than said anode containing casing half having a dished portion of a greater diameter than the dished portion of said anode containing casing half and an outwardly flared edge extending therefrom, said edge being rolled about a resilient gasket surrounding said rim to force said gasket to fill the space within said rim and to seal said casing halves together.

5. In a primary dry cell containing an anode and a cathode, a metallic anode containing casing half having a cylindrical dished portion with an annular flange extending outwardly therefrom and a rolled rim at the outer edge of said flange, said rim being rolled through an angle of approximately 270° with the edge of the rim spaced from the adjacent surface of said flange, a cathode containing casing half of substantially stronger metal than said anode containing casing half having a dished portion of a greater diameter than the dished portion of said anode containing casing half and an outwardly flared edge extending therefrom, said edge being rolled through an angle in excess of 180° about a resilient gasket surrounding said rim to force said gasket to fill the space within said rim and to seal said casing halves together.

References Cited in the file of this patent

UNITED STATES PATENTS

| | | |
|---|---|---|
| 2,495,247 | Friedman | Jan. 24, 1950 |
| 2,509,249 | Rhodes | May 30, 1950 |
| 2,593,893 | King | Apr. 22, 1952 |
| 2,669,597 | Ruben | Feb. 16, 1954 |
| 2,798,988 | Sparkes | July 9, 1957 |
| 2,837,593 | Rueger | June 3, 1958 |